(12) United States Patent
Philippov et al.

(10) Patent No.: US 10,623,466 B2
(45) Date of Patent: *Apr. 14, 2020

(54) BEAM DEVICE ARCHITECTURE

(71) Applicant: Airbnb, Inc., San Francisco, CA (US)

(72) Inventors: Sergey Philippov, San Francisco, CA (US); Andrei Goverdovskii, Moscow (RU); Alexander Sadao Blackstock, San Francisco, CA (US); Andrew Anthony Vilcsak, San Francisco, CA (US)

(73) Assignee: Airbnb, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/367,072

(22) Filed: Mar. 27, 2019

(65) Prior Publication Data
US 2019/0222626 A1    Jul. 18, 2019

Related U.S. Application Data

(63) Continuation of application No. 15/286,423, filed on Oct. 5, 2016, now Pat. No. 10,298,658.
(Continued)

(51) Int. Cl.
| | |
|---|---|
| *G06F 15/16* | (2006.01) |
| *H04L 29/08* | (2006.01) |
| *H04L 29/06* | (2006.01) |
| *H04W 4/18* | (2009.01) |
| *H04W 88/06* | (2009.01) |
| *H04W 88/10* | (2009.01) |

(Continued)

(52) U.S. Cl.
CPC .......... *H04L 67/02* (2013.01); *H04L 63/0428* (2013.01); *H04L 67/04* (2013.01);
(Continued)

(58) Field of Classification Search
USPC ........ 709/203, 204; 705/51; 455/431, 456.1, 455/456.3; 701/2
See application file for complete search history.

(56) References Cited

U.S. PATENT DOCUMENTS 6,665,601 B1 * 12/2003 Nielsen .................. H04L 12/40
701/50
8,001,274 B2    8/2011 Srinivasan et al.
(Continued)

OTHER PUBLICATIONS

PCT International Search Report and Written Opinion, PCT Application No. PCT/US2016/056462, dated Feb. 7, 2017, 12 pages.
(Continued)

*Primary Examiner* — Quang N Nguyen
(74) *Attorney, Agent, or Firm* — Fenwick & West LLP (57) ABSTRACT

A communications system provides access to services when direct Internet connectivity is not practical. The system includes a beam modem and a beam API server. The beam modem receives a web request from a client device through a short range interface, modifies the request, and transmits the modified web request to the beam API server via a cellular connection. The beam API server then extracts an endpoint address and request data from the web request and determines an external web service from the endpoint address. The server transmits the request data to the external web service and, after receiving a response to the request data, reduces the size of the response data and sends it back to the beam modem via the cellular connection. The beam modem converts the response data to client device readable form and transmits it to the client device via the short range interface.

18 Claims, 9 Drawing Sheets

Related U.S. Application Data (60) Provisional application No. 62/246,415, filed on Oct. 26, 2015.

(51) Int. Cl.
*H04W 12/02* (2009.01)
*H04W 4/60* (2018.01)
*H04W 4/80* (2018.01)
*H04W 88/04* (2009.01)
*H04W 88/02* (2009.01)

(52) U.S. Cl.
CPC .............. *H04L 67/16* (2013.01); *H04L 67/20* (2013.01); *H04L 67/28* (2013.01); *H04L 67/2823* (2013.01); *H04L 67/2828* (2013.01); *H04L 67/42* (2013.01); *H04W 4/18* (2013.01); *H04W 4/60* (2018.02); *H04W 4/80* (2018.02); *H04W 12/02* (2013.01); *H04W 88/06* (2013.01); *H04W 88/10* (2013.01); *H04W 88/02* (2013.01); *H04W 88/04* (2013.01)

(56) References Cited

U.S. PATENT DOCUMENTS

| | | |
|---|---|---|
| 2002/0129008 A1 | 9/2002 | Hickey |
| 2002/0155844 A1* | 10/2002 | Rankin ................. H04W 4/029 455/456.1 |
| 2003/0074319 A1* | 4/2003 | Jaquette .............. G06F 21/6218 705/51 |
| 2008/0288600 A1 | 11/2008 | Clark |
| 2009/0186611 A1* | 7/2009 | Stiles ................. H04B 7/18506 455/431 |
| 2010/0250672 A1 | 9/2010 | Vance et al. |
| 2012/0019365 A1* | 1/2012 | Tuikka ................... G06Q 30/02 709/204 |
| 2013/0254264 A1* | 9/2013 | Hankinson ........ H04L 29/06047 709/203 |
| 2015/0019618 A1* | 1/2015 | Brookfield .............. G06F 16/23 709/202 |
| 2015/0058577 A1 | 2/2015 | Earl |
| 2015/0201062 A1 | 7/2015 | Shih et al. |
| 2015/0269258 A1 | 9/2015 | Hunt |
| 2016/0135006 A1* | 5/2016 | Fjeldsoe-Nielsen ........................ H04W 4/023 455/456.3 |
| 2019/0143937 A1* | 5/2019 | Hatton ................... B60R 25/24 701/2 |

OTHER PUBLICATIONS

United States Office Action, U.S. Appl. No. 15/286,423, dated Aug. 6, 2018, 15 pages.

* cited by examiner

BEAM DEVICE ARCHITECTURE

CROSS REFERENCE TO RELATED APPLICATIONS

This application is a continuation of prior, U.S. application Ser. No. 15/286,423, filed on Oct. 5, 2016, (now U.S. Pat. No. 10,298,658, issued May 21, 2019), which claims the benefit of U.S. Provisional Application No. 62/246,415, filed Oct. 26, 2015, both of which are incorporated herein by reference in their entirety for all purposes.

TECHNICAL FIELD

This application relates generally to telecommunications, and particularly to systems and methods for providing access to data services in severely network-constrained environments.

BACKGROUND

In many parts of the world, people have become accustomed to nearly constant data connectivity through Wi-Fi, cellular, or other connections. Indeed, many consider connection to certain electronic services as essential. This is especially true when traveling away from home in an unfamiliar place. In these situations, travel applications provide guidance essential to creating an enjoyable experience for the traveler.

However, there are many regions in which data connectivity is limited and/or prohibitively expensive. For example, in some areas like China, it may be difficult to buy a local subscriber identification module (SIM) or card. A SIM card is an integrated circuit chip that securely stores the international mobile subscriber identity (IMSI) number and its related key, which are used to identify and authenticate subscribers on mobile telephony devices (such as mobile phones and computers). Without a local SIM card, users may not be able to access data networks in these areas.

Also, in some areas like Cuba, the Internet is characterized by a low number of connections, limited bandwidth, censorship, and high cost. The Internet in Cuba has stagnated since its introduction in the late 1990s because of lack of funding, tight government restrictions, the U.S. embargo, and high costs. Similarly, the Internet in some parts of Africa is limited by a lower penetration rate when compared to the rest of the world. Indeed, most African countries currently have very limited internet availability. Additionally, the network infrastructure that does exist on the continent is concentrated in South Africa, Morocco, Egypt and smaller economies like Mauritius and Seychelles.

SUMMARY

The present disclosure provides systems and methods to provide access to services that otherwise would require an Internet connection. A communications system for providing access to services includes a client device, a beam modem communicatively coupled to the client device, and a beam application programming interface (API) server communicatively coupled to the beam modem. The client device and beam modem are connected via short range transceivers. The beam modem connects to the beam API server via a cellular transceiver in the beam device. The client device is programmed to generate a web request consisting of an endpoint address and request data, encrypt the web request, and transmit the encrypted web request to the beam modem via the short range transceiver in the client device. The beam modem is programmed to receive the encrypted web request via the short range transceiver in the beam modem, decrypt the encrypted web request, add hypertext transfer protocol (HTTP) headers to the web request to create a modified web request, and transmit the modified web request to the beam API server via the cellular transceiver. The beam API server is programmed to receive the modified web request, determine an external web service based at least in part on the endpoint address in the request, transmit the request data to the external web service, and receive response data from the external web service in response to the request data. After receiving the response data, the beam API server is programmed to reduce the size of the response data by (1) removing unnecessary data, (2) minifying the response data, and (3) compressing the response data to produce reduced response data. The beam API server then transmits the reduced response data to the beam modem. After receiving the reduced response data, the beam modem is further programmed to decompress the reduced response data to produce decompressed response data, encrypt the decompressed response data and transmit the decompressed response data to the client device via the second short range transceiver.

BRIEF DESCRIPTION OF THE DRAWINGS

The disclosure has other advantages and features which will be more readily apparent from the following detailed description of the disclosure and the appended claims, when taken in conjunction with the accompanying drawings, in which:

The figures depict various embodiments for purposes of illustration only. One skilled in the art will readily recognize from the following discussion that alternative embodiments of the structures and methods illustrated herein may be employed without departing from the principles of the disclosure described herein.

DETAILED DESCRIPTION

Figure 1:
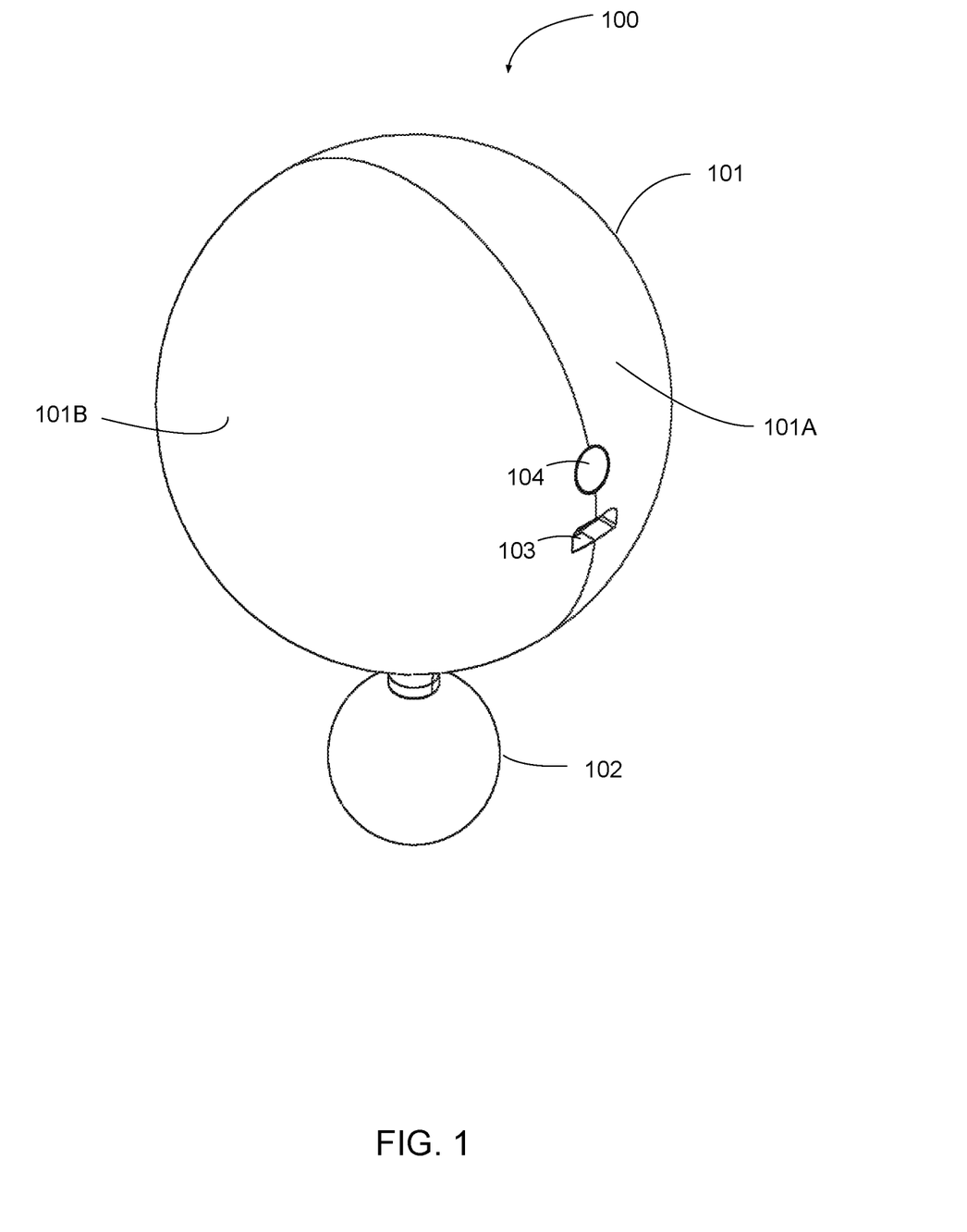
FIG. 1 illustrates an exemplary beam modem.

FIG. 1 is an exemplary embodiment of the beam modem or gateway 100. As shown in FIG. 1, the beam modem 100 may include a primary housing 101 and a secondary housing 102. In this example, the secondary housing 102 is a physical design feature and does not contain any of the electrical components of the beam modem 100. In other embodiments, the secondary housing 102 may include electrical components of the beam modem 100 including, for example, antennas or batteries. The primary housing 101 may be made of two parts 101A and 101B as shown. In this example, the two parts 101A and 101B are for manufacturing convenience. In the embodiment shown in FIG. 1, the primary housing 101 encloses a printed circuit board (PCB) and the internal components of the beam modem 100.

The beam modem 100 components may include a short range transceiver (such as a Bluetooth Low Energy (BLE) system on a chip (SoC)), a cellular transceiver/modem, an antenna used for amplifying the signals of the modem (that may be adhesive-backed or glued on the inside of the housing 101), and a subscriber identity module or subscriber identification module (SIM) and SIM card (for operating on cellular networks). Additional components of the beam modem 100 may include a charging module 103 (a charging port or wireless charging unit), a charger (such as an integrated circuit (IC) designed to charge the battery from voltage provided by the charging port), a battery (such as a high-capacity Li—Po battery), current filtering circuitry (such as a system of passive components (inductors, capacitors) designed to condition the power going to the modem), a latching power circuit (for example, an IC which connects and disconnects power from battery to the device based on presses of an external interface), an external interface 104 (such as a button) that serves as both a way to turn the device on/off and indicate the modem status (for example, with an LED that indicates status), a voltage regulator that converts battery voltage to a voltage usable for the BLE SoC, transistors used for driving a high-voltage LED in the external interface through the low-voltage BLE SoC, a programming header used for updating the firmware on the BLE SoC, and/or a resistor divider (a connection of two resistors used to convert high voltage of the battery into voltage range measureable by the BLE SoC).

Figure 2:
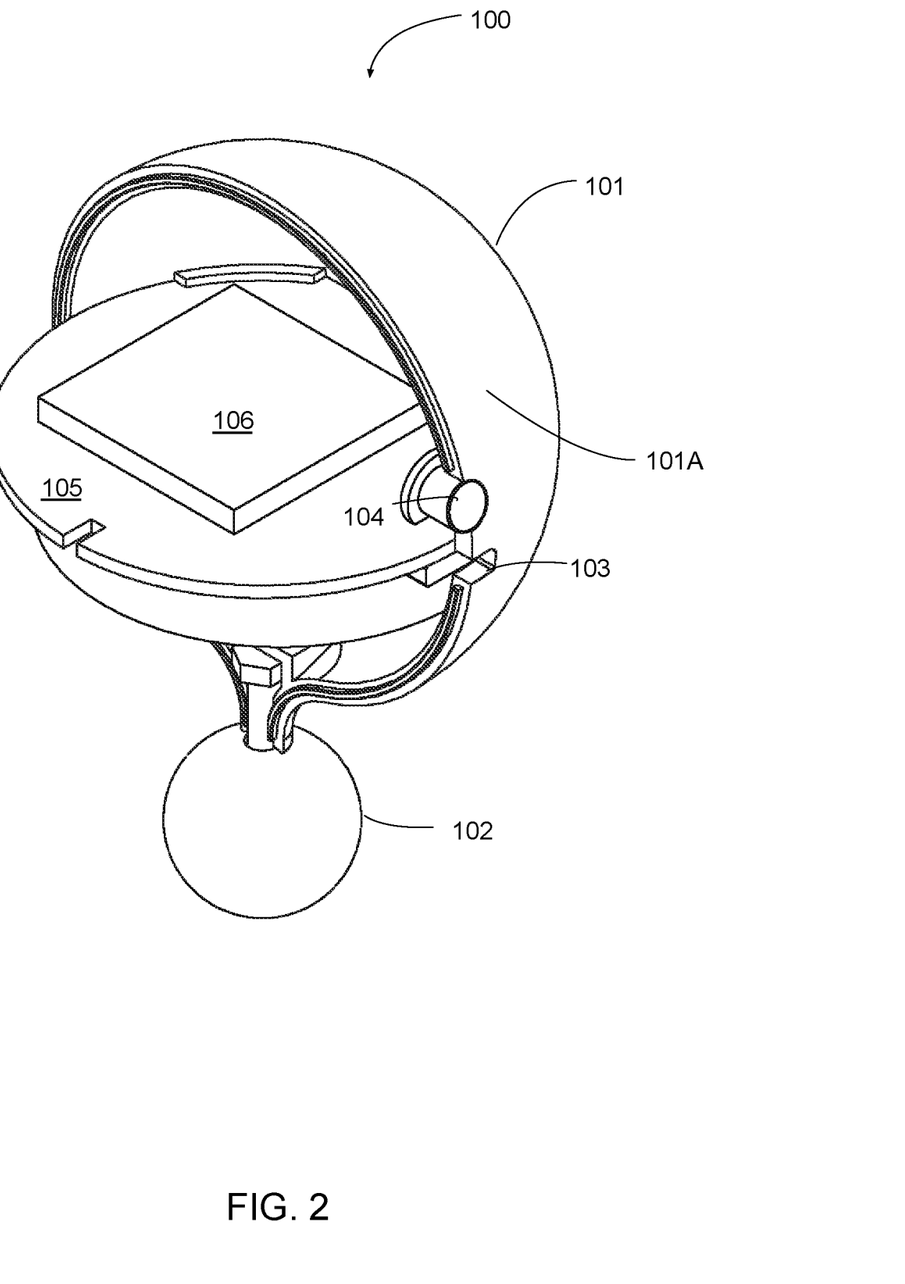
FIG. 2 illustrates an exemplary beam modem with a portion of the housing removed to reveal internal components and structure.

FIG. 2 is an exemplary embodiment of the beam modem or gateway 100 of the present disclosure as shown in FIG. 1, with one part of the secondary housing 101B removed to reveal the PCB 105 inside. FIG. 2 also illustrates the integration of electrical components 106 described above on the PCB 105. The short range transceiver in the beam modem 100 may be a Bluetooth, ZigBee, or infrared transceiver or the like. In one example, the short range transceiver is a BLE SoC such as a Rigado Bluetooth 4.1 Module (BMD-200-B-R). BLE may also be known as Bluetooth Smart or Version 4.0+ of the Bluetooth specification. BLE is a low-power and application-friendly version of Bluetooth. In one example, the cellular transceiver or modem is a GSM Module such as the Telit HE910DAT204R701. The SIM module may include a Nano-SIM holder such as the 732-5954-1-ND from Wurth Electronics, Inc. The charger may be an IC such as the MCP73832T-2ACI/OTTR-ND from Microchip Technology.

Figure 3:
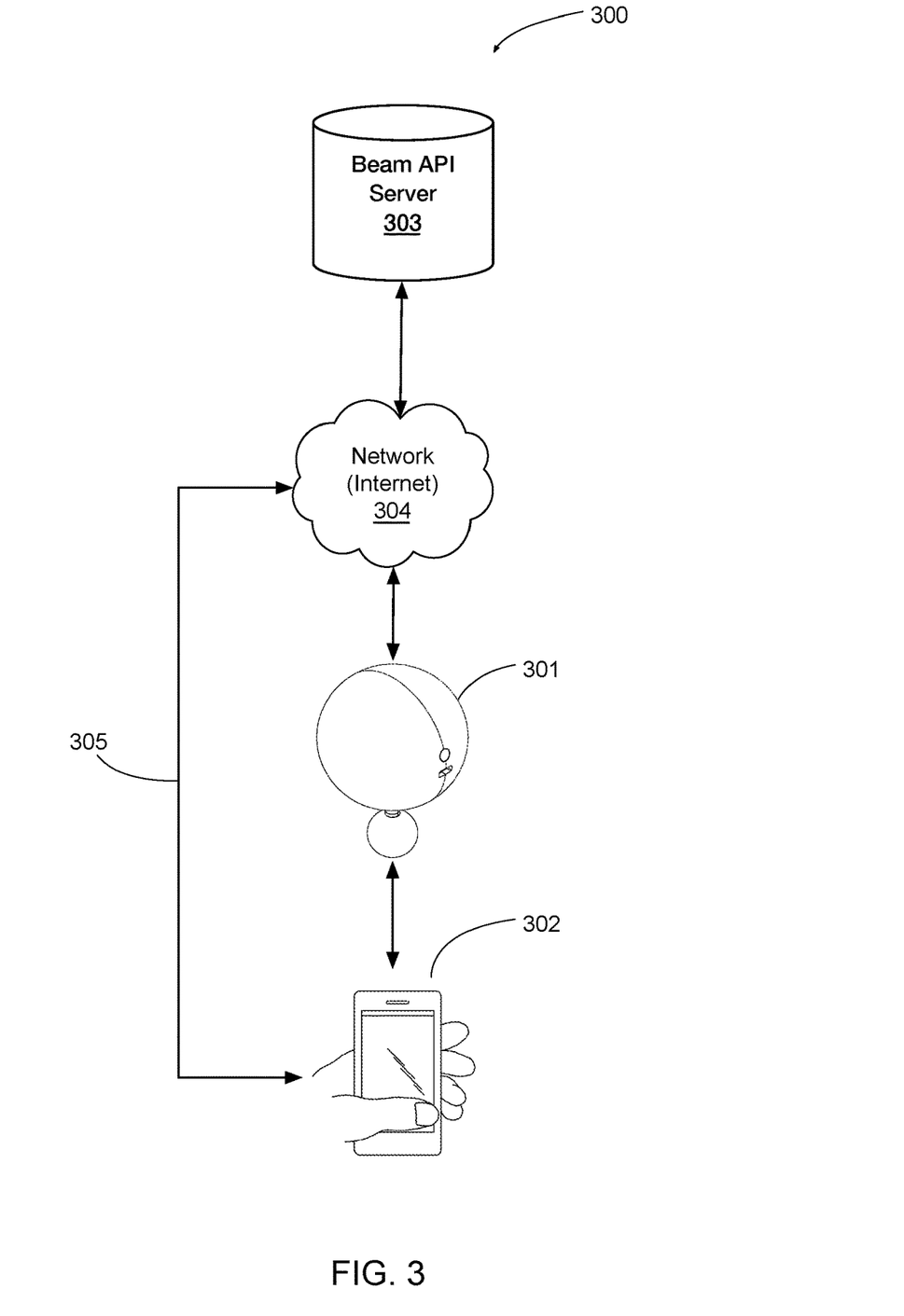
FIG. 3 illustrates an example of a system in which the beam modem enables communication between a user device and a beam API server via a network.

FIG. 3 illustrates an example of a system 300 in which a beam modem 301 enables communication between a client device 302 and a beam API server 303 via a network 304 such as the Internet to provide access to services that otherwise would otherwise be unavailable. The network 304 represents communication pathways between the client device 302 (e.g., consumers) and the beam API server 303. The network can also utilize dedicated or private communication links (e.g. wide area networks (WANs), metropolitan area networks (MANs), or local area networks (LANs)) that are not necessarily part of the Internet. The network uses standard communications technologies and/or protocols.

The client devices 302 are used for interacting with the beam API server 303. A client device 302 can be any device that is—or incorporates—a computer such as a smartphone, tablet, smartwatch, laptop computer, notebook or the like. A computer is a device having one or more general or special purpose processors, memory, storage, and networking components (either wired or wireless). The client device 302 executes an operating system, for example, a Microsoft Windows-compatible operating system (OS), Apple OS X or iOS, a Linux distribution, or Google's Android OS. There are several ways for a client device 302 to interact with the beam system. First, the client device 302 may include a dedicated application for accessing the beam API server 303. Further, third-party applications enable the interaction through, for example, an SDK used with third-party applications that allows the third-party applications to access the beam API server 303. Additionally, the beam software may be included on the system level of the client device operating system (similar to that for a Bluetooth headset or Bluetooth speakers). In this way any application (e.g., dedicated, third-party, or system applications like web browsers) can have access to the beam system provided by client device's 302 operating system.

The beam API server 303 communicates with external web services (not shown) and transfers information between the client device 302 and the external web services directly (communication path 305) at times when the client device 302 has direct network connectivity such as Internet connectivity. The beam API server 303 communicates with the external web services and modifies and transfers information between the client device 302 and the external web services via the beam modem 301 when the client device 302 does not have network connection such as Internet connectivity.

Examples of external web services include third party web services such as accommodation reservation systems, dining reservation systems, rideshare reservation systems, retail systems, and the like. The external web services may include online booking systems that present web pages or other web content that form the basic interface visible to users. Users use their respective client devices 302 to access information and provide data to the external web services.

When traveling in an area in which network connection is unavailable or unreliable or in which network connection is prohibitively expensive or inconvenient, the system shown in FIG. 3 allows a client device 302 to connect to external web services without a direct network connection to the client device 302. As shown in FIG. 3, in one example, the system includes a client device 302, a beam modem 301, and a beam API server 303. The client device 302 includes short range transceiver like a BLE transceiver. The beam modem 301 communicates with the client device 302 via a short range transceiver. The beam modem 301 also includes a cellular transceiver/modem. The beam modem 301 communicates with the beam API server 303 via the cellular modem. The beam modem 301 can be configured specifically for the needs of the area in which the user is traveling. For example, if the user is traveling to Cuba, the beam modem 301 may be configured to connect to local cellular networks including containing a location-specific SIM card. Also, the beam modem 301 may include a worldwide SIM card which can be configured for any country or region. In one embodiment, the client device 302 includes a SIM card from a different country from the country where the beam device 301 is being used. Similarly, the client device 302 may also have a SIM card from a different country from the SIM card used in the beam device 301. In another embodiment, the client device 302 may include a SIM card from a country, and the beam modem 301 may include a worldwide SIM card which can be configured for any country or region.

When the client device 302 needs to get information from an external web service but does not have connection to the network 304, it communicates with the beam modem 301 using the short range transceivers. The client device 302 is programmed to generate a web request that includes an endpoint address (such as an IP address) for the external web service and request data. The client device 302 is also programmed to send the web request to the beam modem 301. The client device 302 may include a dedicated application for communicating with the beam modem 301 and/or beam API server 303. The client device 302 may also encrypt the web request for transmission to the beam modem 301.

The beam modem 301 is programmed to receive the web request via a short range transceiver and decrypt the web request if necessary. As described above, the web request includes an endpoint address for the external web service and request data. To transfer the contents of the web request to the beam API server 303, the beam modem 301 may add transfer protocol headers to the web request to enable transmission on the network 304. For example, the beam modem may add hypertext transfer protocol (HTTP) headers to the web request to create a modified web request. In other examples, the beam modem 301 is programmed to add transmission control protocol (TCP) headers to the web request to create a modified web request. Adding HTTP headers is advantageous because HTTP requests are more universally accepted. However, HTTP requests are also more data intensive than TCP requests. Accordingly, in some embodiments the system 300 includes a beam modem 301 configured to add TCP headers to the web request and a beam API server configured to receive TCP requests.

After creating the modified web request, the beam modem 301 transmits the modified web request to the beam API sever 303 via its cellular modem and a network 304. The beam API server 303 is programmed to receive the modified web request, extract the (1) endpoint address and (2) request data from the web request, and determine an external web service based at least in part on the endpoint address. The beam API server 303 is programmed to then transmit the request data to the external web service and receive response data from the external web service in response to the request data. After that, the beam API server 303 is programmed to reduce the size of the response data by (1) removing unnecessary data, (2) minifying the response data, and (3) compressing the response data to produce reduced response data. The reduction in size of the response data ensures that the limited data connection between the beam API server 303 and the beam modem 301 is used efficiently.

In some examples, removing unnecessary data may include removing some of the results that the external web service sends in response to the request data. For example, if the request data is a search, and the external web service returns 100 search results each with 20 fields, the beam API server 303 may remove all but 10 of the search results and all but 5 of the fields in each search result. The beam API server 303 may determine which search results and fields to keep based on the type of search, the type or identity of the external web service, information about the user, information about the current location of the user, and the like. In another example, the beam API server 303 may remove data-intensive fields, such as images and videos, from the response data.

Additionally, the beam API server 303 may aggregate responses from the external web services before reducing the aggregated responses. For example, a single request for information may result in multiple rounds of back and forth communication between the beam API server 303 and the external web services. To minimize traffic between the beam API server 303 and the beam modem 301 and client device 302, the beam API server aggregates the back and forth communications with the external web service, isolates the data responsive to the request data, and removes the extraneous information before sending the reduced response data to the beam modem 301. Additionally, if the external web service sends periodic or frequent updates in response to request, the beam API server 303 may be programmed to reduce the rate at which the updates are sent by sending updates only at specific time intervals or upon specific events. Indeed, logic in the beam API server 303 may be configured to only send updates at certain time intervals so that the external web service does not need to be in constant contact with the client device 302. The client device 302 is accordingly programmed (via an application for example) to expect the reduced data responses provided by the beam API server 303.

One example of the beam API server 303 reducing frequent updates is use with a vehicle request service such as Uber™ or Lyft™. Vehicle request services include online transportation networks that allow consumers with connected devices to submit vehicle requests which are assigned to a driver and alert the driver to the location of the customer. After a vehicle request is received by an external vehicle request web service, the vehicle request service may send frequent updates to apprise the client of the location of the assigned driver's vehicle. On many networks, the amount of data used for these updates is insignificant. In other situations, the amount of data required for these frequent updates is undesirable. The beam API server 303 may be programmed to send updates on the vehicle location at certain intervals (e.g., every 2 minutes or every 1 mile driven by the requested vehicle) or at certain events (e.g., check points along the way or at arrival).

In some examples, removing unnecessary data may include removing unnecessary HTTP headers. In addition to a response header, the HTTP response may include general headers and the entity headers that may be unnecessary for the beam API server 303 to communicate the response data to the beam modem 301. Also, the HTTP request response may have multiple optional headers that are not necessary to respond to the request data from the client device 302. For example, web servers, frameworks and applications often set optional response headers that reveal software in use and version information. Also, headers beginning with "X-" are non-standard headers and are optional and may be removed if not responsive to request data from the client device 302. The beam API server 303 may pare down the response headers to just the response headers necessary for the response.

The beam API server 303 is also programmed to reduce the size of the response data by minifying the response data. Minification removes all unnecessary characters from the response code without changing its functionality. Examples of these unnecessary characters include white space characters, new line characters, comments, and sometimes block delimiters, which are used to add readability to the code but are not required for it to execute. The minified code reduces the amount of data that needs to be transferred.

The beam API server 303 is also programmed to reduce the size of the response data by compressing the response data to produce reduced response data. The beam API server 303 may be programmed to compress the response data using a key map of the response data, and the beam modem may be programmed to decompress the compressed response data using the key map. One example of this is key-map compression of Java Script Object Notation (JSON) code. JSON is a lightweight data-interchange format that is easy for humans to read and write. JSON can be used as a data interchange format, just like XML and compared to XML, JSON has several advantages. JSON is simple, it has a self-documenting format, and it is much shorter because there is no data configuration overhead. However, JSON heavily relies on quotes and key names that are often repeated. Key mapping JSON compression algorithms can solve these problems and reduce the size of a JSON response. For example, the beam API server 303 may compress JSON code by removing the need to constantly repeat key names. Using this compression algorithm, the following JSON:

```
[
  { // This is a point
    "x": 100,
    "y": 100
  }, { // This is a rectangle
    "x": 100,
    "y": 100,
    "width": 200,
    "height": 150
  },
  { }, // an empty object
]
```

Can be compressed as:

```
{
  "templates": [
    [0, "x", "y"], [1, "width", "height"]
  ],
  "values": [
    {"values": [ 1, 100, 100 ] },
    { "values": [2, 100, 100, 200, 150 ] },
    { }
  ]
}
```

In addition, the beam API server 303 may compress JSON code by reducing the number of characters used to represent a generic homogeneous collection including by removing keys from the structure creating a header on index 0 with each property name and/or by assuming that there are duplicated entries. Using this kind of compression algorithm, the following JSON:

```
[{
  name : "Andrea",
  age : 31,
  gender : "Male",
  skilled : true
}, {
  name : "Eva",
  age : 27,
  gender : "Female",
  skilled : true
}, {
  name : "Daniele",
  age : 26,
  gender : "Male",
  skilled : false
}]
```

Can be compressed as:

```
[["name","age","gender","skilled"],
["Andrea",31,"Male",true],["Eva",27,"Female",true],
["Daniele",26,"Male",false]]
```

In the case that the structure of the JSON response is known, a YAML (Yet Another Markup Language) file may be used to describe how to mask/eliminate fields from the response. When the structure is unknown, certain critical fields are selected and reformed into a new response structure. In some embodiments, the external web service being accessed may provide the server 303 with the YAML file that determines how content from the service is to be compressed.

Also, the beam API server 303, may be programmed to compress the response data by zipping the response data, and the beam modem may be programmed to decompress the compressed response data by unzipping the response data. The beam API server 303 may use GZip or another zipping utility.

After the beam API server 303 has reduced the response data, it transmits the reduced response data to the beam modem 301 via the network 304 and cellular modem/transceiver in the beam modem 301. The beam modem 301 is programmed to receive the reduced response data via the cellular transceiver and decompress the reduced response data to produce decompressed response data. The beam modem 301 may then encrypt the decompressed response data and transmit the decompressed response data to the client device 302 via the short range transceiver in the beam modem 301.

The client device 302 may also be programmed to transfer client information to the beam API server 303 when the client device 302 has a network (e.g., Internet) connection. The communication between the beam API server 303 and the client device 302 when the client device 302 has a network connection is shown as communication path 305 in FIG. 3. The beam API server 303 may be programmed to use the client information to respond to a request for information from an external web service in response to request data transmitted to the external web service. For example, the client device 302 may directly transmit personal information to the beam API server 303 including preferences, log in information for external web services (e.g., ID and password), and travel destinations when the client device 302 has an Internet connection. The beam API server 303 may also have additional web service specific information stored such as which fields are important to the client.

The personal information and other stored data on the beam API server 303 may be used to respond to requests from the external web services as part of supplying the response to the request data from the client device 302 when the client device does not have an Internet connection. For example, if the client device 302 sends a request for the location of a site stored in a "favorite locations" area at the external web service, the external web service to which the request is routed may respond by requesting a user name and password to access the account under which the "favorite locations" are stored. To prevent the beam API server 303 from having to send a query back to the client device 302 to get the requested information, this information may be stored on the beam API server 303 before the client travels to a location with limited network access. In addition, the user may transmit the client information to the beam API server 303 using other devices than the client device 302. For example, a user may use a personal computer to transmit the client information to the beam API server 303 instead of the client device 302.

In one embodiment, the beam API server 303 is programmed to transfer data supplemental to the request data to the client device 302 when the client device 302 has a network 304 (such as the Internet) connection. The communication between the beam API server 303 and the client device 302 when the client device 302 has a network connection is shown as communication path 305 in FIG. 3. The client device 302 may be programmed to use the supplemental data to augment the decompressed response data from the beam modem. One example of this pre-caching of data on the client device 302 is map data. Before a trip, when the user has a good connection to the Internet, the beam API server 303 receives information about where the user will be traveling and communicates with the client device 302 to store map data for the travel location on the client device 302. Then, when the user is traveling in the specified location and sends a web request for location data, the beam API server 303 only has to transmit data that has not already been pre-cached such as the location of a restaurant or point of interest, but does not have to transmit map data to enable navigation on the client device 302.

In some embodiments, an application on the client device 302 constrains or limits the web requests to a predetermined list of external web services, filters out requests for web services, and/or limits the types of requests sent to an external web service. The client device 302 thereby filters requests that are data-intensive or would require data-intensive responses and thereby saves data traffic that would otherwise result in insufficient-information responses or request/response errors. The client device 302 may limit the web requests to external web services for which (1) the client device 302 has transferred client information to the beam API server 303 when the client device 302 has a network 304 connection and/or (2) the beam API server 303 has transferred supplemental data to the client device 302 when the client device 302 has a network 304 connection.

In one example, before a trip, a user enters a destination in the client device 302 (or another device) and selects services—such as maps and messaging—that the user wants to have access too. Since the client device 302 still has network communication, it is able to connect to the beam API server 303 via the network connection 305. The client device 302 transmits the destination information and the selected service information to the beam API server 303. The beam API server 303 connects to the external web services for the selected services (e.g., maps and messaging) and determines how to provide access to the selected services while reducing data transit between the client device 302 and the beam API server 303 when the user arrives at the destination. The beam API server 303 determines what information can be stored on the beam API server 303 to assist with responses to the external web services and obtains that information from the client device 302 (from stored information or by prompting the client device 302 to query the user) or other sources. The beam API server 303 also determines what information can be pre-cached on the client device 302 to provide access to the selected services and reduce data transit between the client device 302 and the beam API server 303 when the user arrives at the destination.

Additionally, the client device 302 and/or beam API server 303 may determine beforehand what services to make available when the user arrives at the destination. The beam API server 303 may transmit this information to the client device 302 via network connection 305. In addition to the examples described above, the client device 302 and/or beam API server 303 may determine what services to make available based on the amount of data a request and/or response to the external web service would require. Similarly, the client device 302 and/or beam API server 303 may determine certain types of requests within an external web service to make available based on the amount of data the certain types of requests and corresponding responses to would require. Also, the client device 302 and/or beam API server 303 may determine what services to make available based on the beam API server's 303 ability to modify the response from the external web service to reduced its size.

Figure 4:
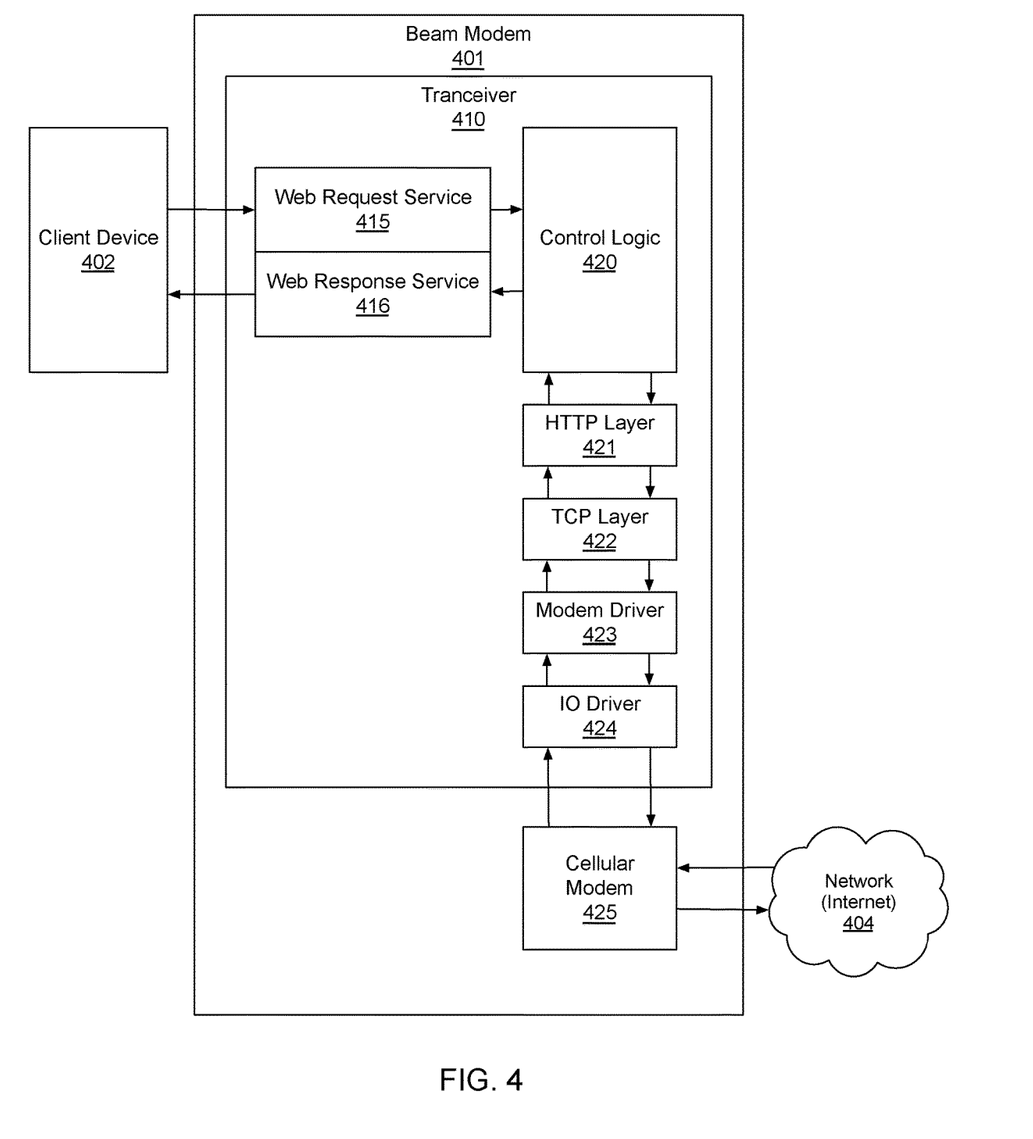
FIG. 4 is a block diagram of an embodiment of a beam modem.

FIG. 4 is a block diagram of an embodiment of the beam modem 401. As shown in FIG. 4, the beam modem 401 is communicatively coupled to the client device 402. This two-way communication may be accomplished with a short range communication protocol like BLE as previously described. The short range transceiver 410 in the beam modem 401 is illustrated in FIG. 4. The web request service 415 and web response service 416 are the interface of the transceiver 410 in the beam modem 401. The web request service 415 and web response service 416 are responsible to broadcast available services, parameters, and characteristics (such as read only, write only, read/write, and/or notify).

In an example in which the transceiver 410 is a Bluetooth transceiver, the web request service 415 and web response service 416 establish and maintain the bidirectional data communication between the beam modem 401 and the client device 402. The creation of a connection between the beam modem 401 and the client device 402 may be an asymmetric procedure by which an advertiser announces through the advertising channels that it is a connectable device, while the other device (referred to as an initiator) listens for such advertisements. When an initiator finds an advertiser, it may transmit a connection request message to the advertiser, which creates a point-to-point connection between the two devices. Both devices can then communicate by using the physical data channels. BLE defines two device roles at the link layer for a created connection: the master and the slave. These are the devices that act as initiator and advertiser during the connection creation, respectively.

The transceiver 410 may include control logic 420 such as that in a BLE SoC for example. Alternatively, the beam modem 401 may have control logic outside of the transceiver 410. Similarly, the beam modem 401 may include an HTTP layer module 421 to enable the beam modem 401 to make HTTP requests. The beam modem 401 may also include a TCP layer module to enable the beam modem 401 to make TCP requests. The beam modem 401 also may include a cellular modem 425 to enable cellular communication as well as a modem driver 423 (that provides generic modem requirements including high level commands (e.g., open port, wait amount of time, get response) and transform TCP requests to a set of AT commands) and an I/O driver 424 specific to the cellular modem 425 selected.

In one example, client device 402 prepares a web request consisting of an endpoint address (e.g., IP address) and request data to be transferred and sends it to a beam modem 401 via a BLE connection. The web request service 415 may be in an encrypted form. The BLE transceiver 410 in the beam modem 401 receives the data, decrypts it and adds the necessary HTTP headers and forwards it to the cellular modem 425 in the beam modem 401 in a modem-specific format. The cellular modem 425 makes the connection to the cellular network, connects to the specified endpoint and sends the request data and waits for the end-point to send a response. The endpoint's response is sent by the modem 425 back to the BLE transceiver 410, where it is parsed (reassembled back into format the client device 402 can understand), encrypted and sent back to the client device 402 via the web response BLE service 416. In one embodiment, the beam modem 401 components may be integrated into the client device 402 to enable data saving and/or battery saving. In the integrated example, the communication between the client device 402 and the beam modem 401 is via hard-wired connections in the client device 402 instead of via a short range system.

Figure 5:
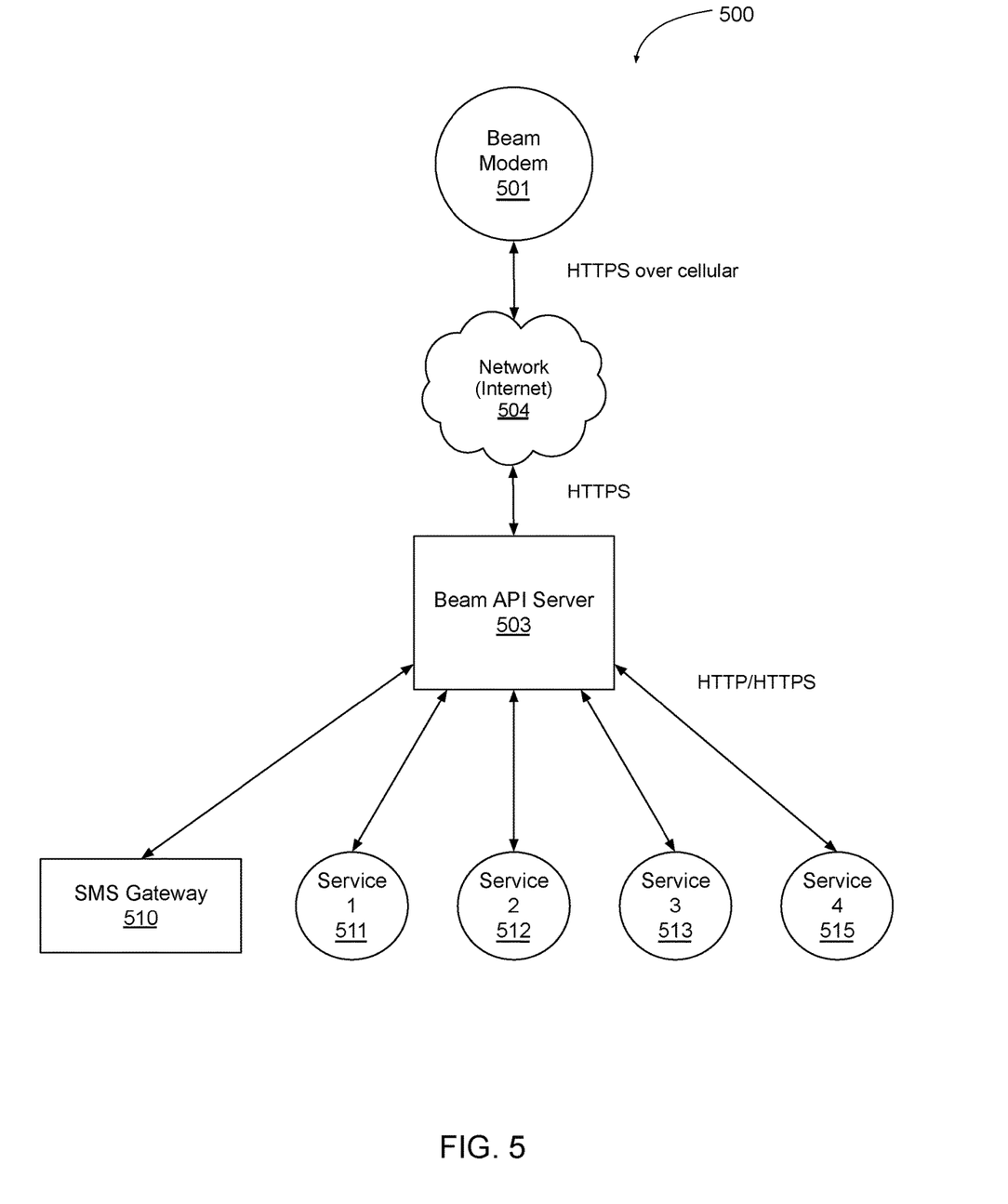
FIG. 5 illustrates a system in which a beam modem communicates with external web services via a beam API server in a limited-data network.

FIG. 5 illustrates a system 500 in which a beam modem 501 communicates with external web services 510-515 via a beam API server 503 in a limited-data network 504. The external web services 510-515 may include messaging services, accommodation reservation systems, dining reservation systems, rideshare reservation systems, retail systems, and the like. In this example, the beam modem 501 is communicatively coupled to a client device (not shown) via a short range transceiver. The beam modem 501 also includes a cellular transceiver for connecting to the network 504 and thereby to the beam API server 503.

The beam modem 501 is programmed to receive a web request consisting of an endpoint address and request data from the client device via the short range transceiver and the then add HTTP headers to the web request to create a modified web request. In one example, the web request is a SMS get/post request, and the external web service 510 is an SMS gateway. The beam modem 501 is also programmed to transmit the modified web request to the beam API server 503 via the cellular transceiver. After receiving the modified web request, the beam API server 503 is programmed to determine an external web service 510-515 based at least in part on the endpoint address. After determining the appropriate external web service 510-515, the beam API server 503 transmits the request data to the external web service 510-515 and receives response data from the external web service 510-515 in response to the request data. After receiving the response data, the beam API server 503 reduces the size of the response data by (1) removing unnecessary data, (2) minifying the response data, and/or (3) compressing the response data to produce reduced response data. The beam API server 503 then transmits the reduced response data to the beam modem 501.

After the beam modem 501 receives the reduced response data, the beam modem 501 is programmed to decompress the reduced response data to produce decompressed response data, encrypt the decompressed response data and transmit the decompressed response data to the client device via the short range transceiver.

In one example of a request from the beam modem 501, a user of a client device issues a web request that is transmitted to the beam API server 503. The beam API server 503 uses the contents of the request to determine which external web service 510-515 to consult for data, and forwards the request to that service 510-515. In the case of an SMS get/post request, the request is routed to an external SMS gateway 510. The beam API server 503 receives response data from the requested service and aggressively compresses it. The reduced size response is returned to and decoded on the beam modem 501.

Figure 6A:
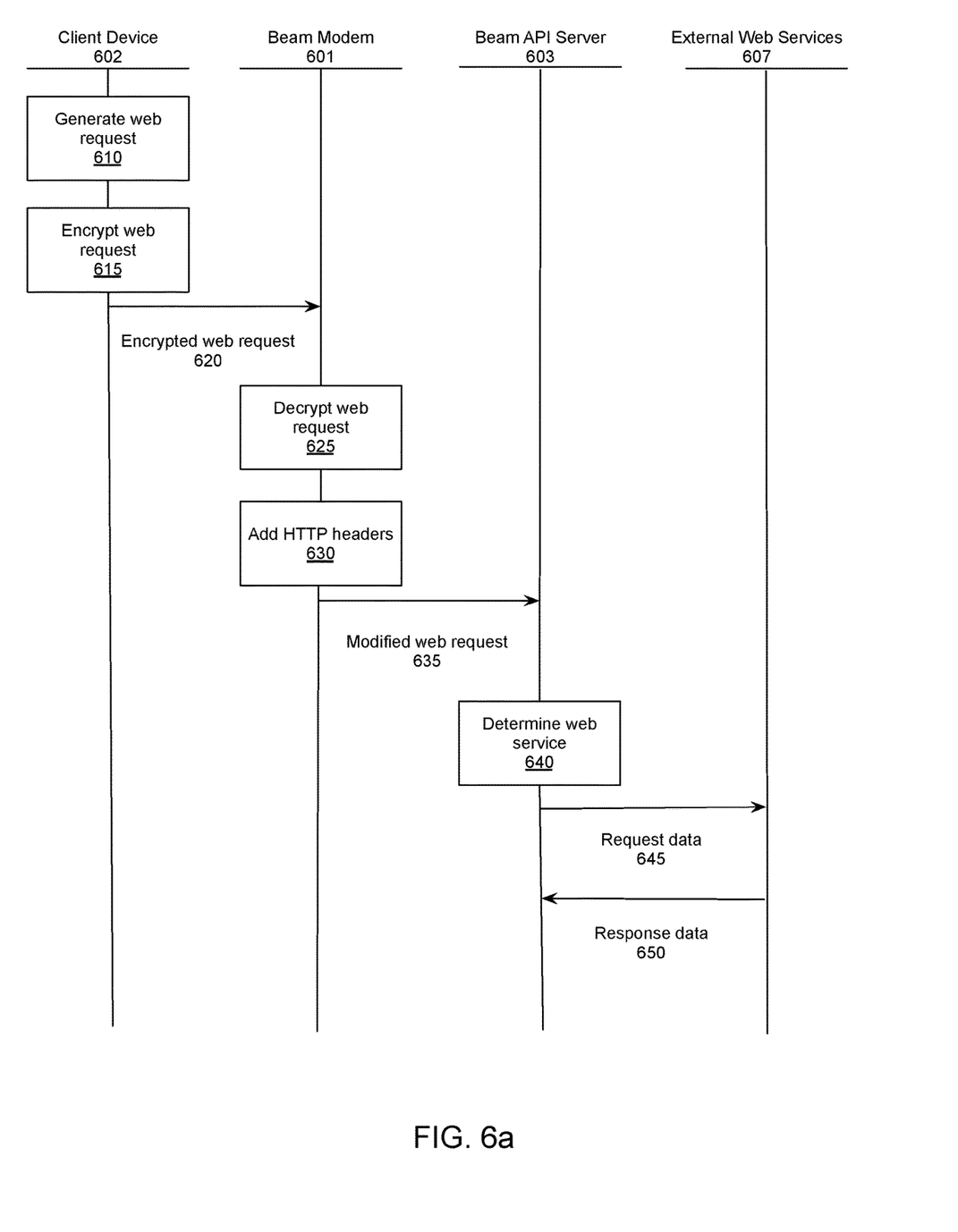
FIGS. 6a and 6b are flow charts illustrating exemplary methods of addressing, routing, and data traffic control between a client device, a beam modem, a beam API server, and an external web service.
Figure 6B:
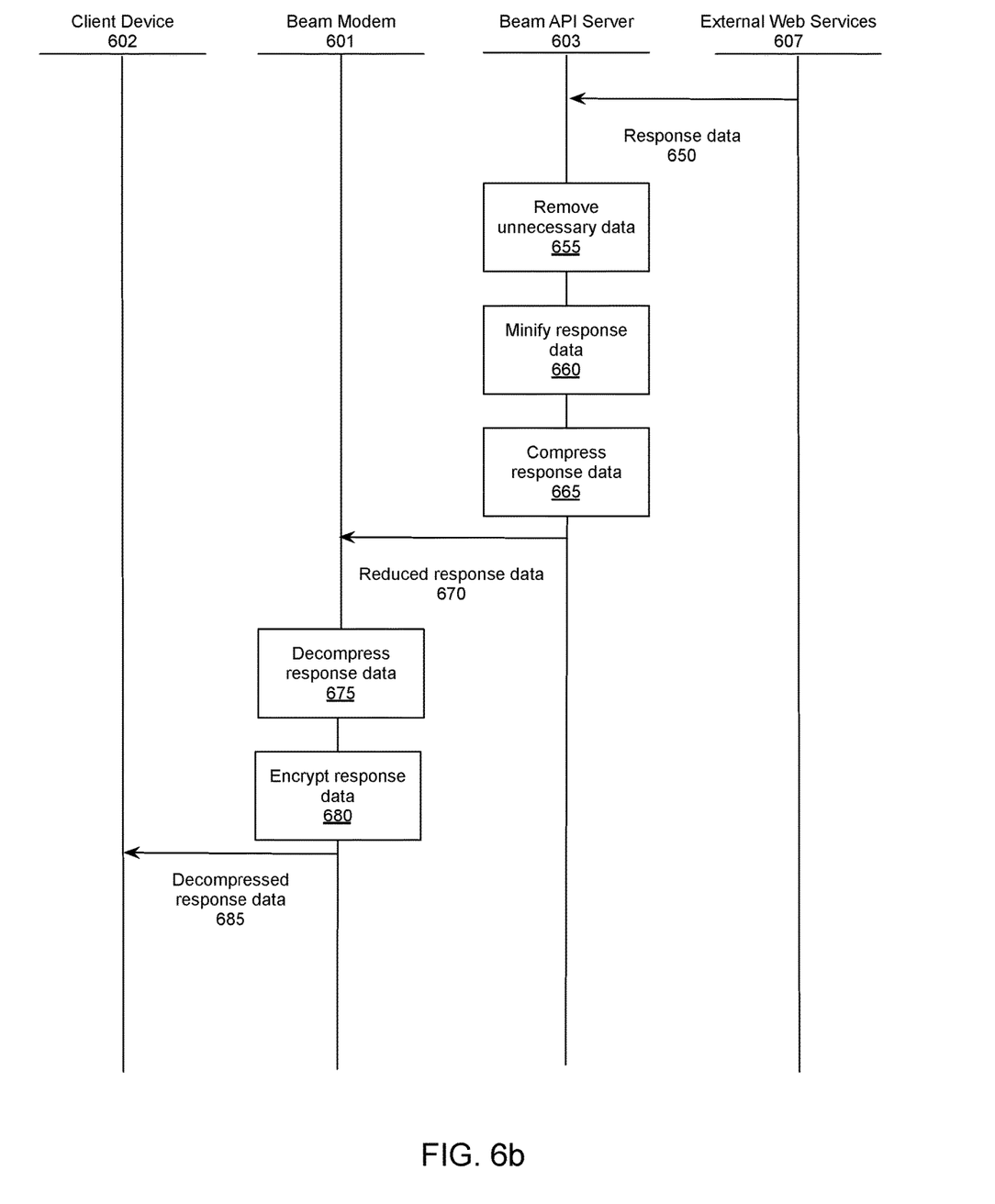

FIGS. 6a and 6b illustrate an exemplary method of addressing, routing, and data traffic control using the client device 602, beam modem 601 and beam API server 603. As shown in FIG. 6a, a client device 602 generates a web request 610 consisting of an endpoint address and request data. The client device 602 then encrypts the web request 615 and transmits the encrypted web request 620 to a beam modem 601 via a short range transceiver.

The beam modem 601 receives the encrypted web request 620 via a short range transceiver and decrypts the encrypted web request 625. The beam modem 601 then adds hypertext transfer protocol (HTTP) headers to the web request 630 to create a modified web request and transmits 635 the modified web request to a beam API server 603 via a cellular transceiver.

The beam API server 603 receives the modified web request 635 and determines 640 an external web service 607 based at least in part on the endpoint address. The beam API sever 603 then transmits the request data 645 to the external web service 607. In response to the request data, the beam API server 603 receives response data 650 from the external web service 607. The method then continues as shown in FIG. 6b. The step of receiving the response data 650 from the external web service 607 is repeated in FIG. 6b to show continuity between FIGS. 6a and 6b but does not indicate that this step must be repeated. The beam API server 603 then reduces the size of the response data by (1) removing unnecessary data 655, (2) minifying the response data 660, and/or (3) compressing the response data 665 to produce reduced response data. The beam API server 603 then transmits the reduced response data 670 to the beam modem 601.

After beam modem 601 receives the reduced response data 670 via the cellular transceiver, it decompresses the reduced response data 675 to produce decompressed response data. The beam modem 601 then encrypts the decompressed response data 680 and transmits the decompressed response data 685 to the client device 602 via the short range transceiver in the beam modem 601.

Figure 7:
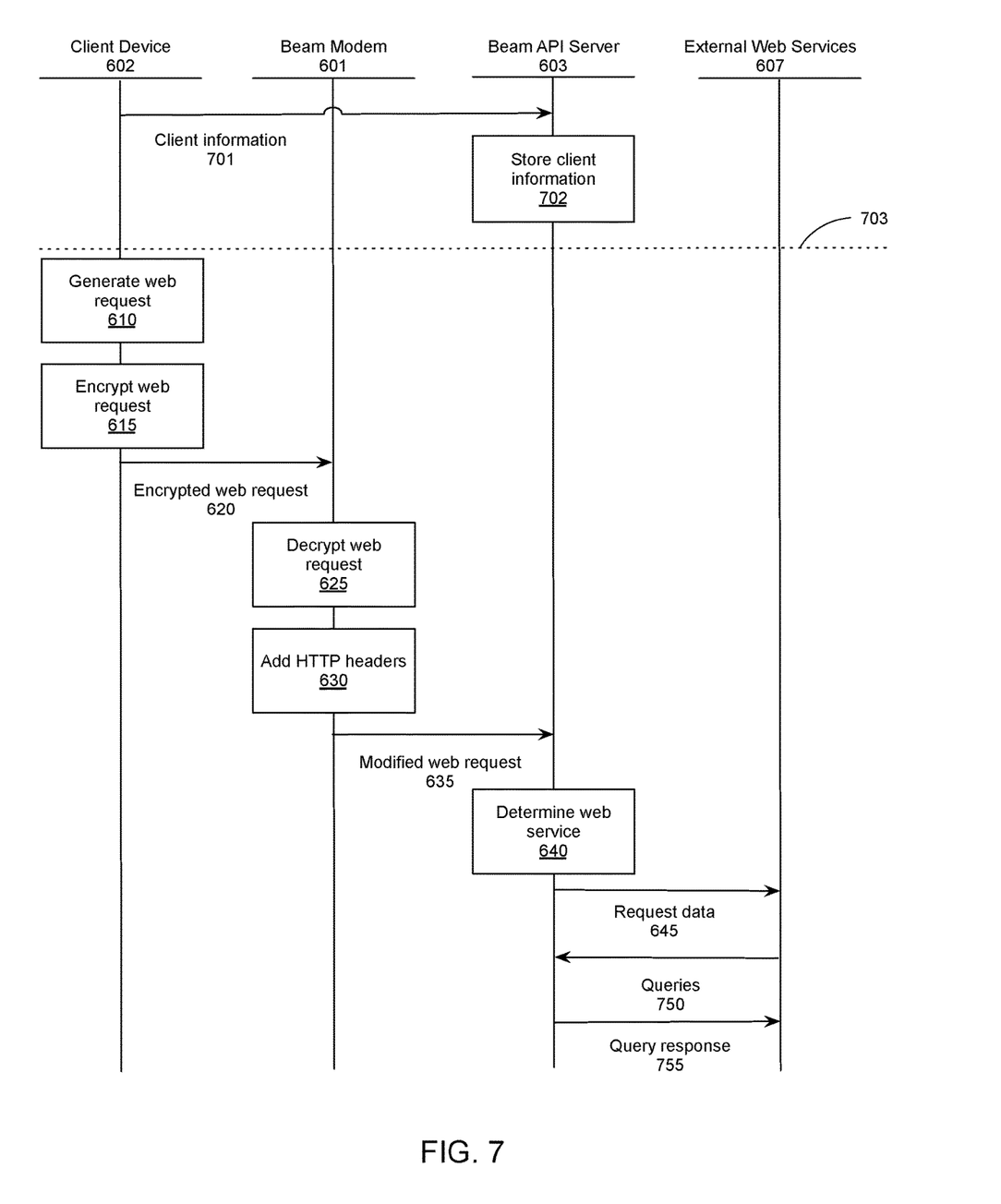
FIG. 7 illustrates exemplary methods of addressing, routing, and data traffic control between a client device, a beam modem, a beam API server, and an external web service.

FIG. 7 illustrates another exemplary method of addressing, routing, and data traffic control with the client device 602, beam modem 601 and beam API server 603 that may be used in addition to and/or in conjunction with the methods illustrated in FIGS. 6a and 6b. When the client device 602 has a network (e.g., Internet) connection, the client device 602 may transfer client information 701 directly to the beam API server 603. Dotted line 703 indicates the presence of a network connection between the client device 602 and the beam API server 603 without the beam modem 601. Above the dotted line 703, there is a network connection between the client device 602 and the beam API server 603 without the beam modem 601 (for example before the user arrives in an area with limited network connectivity). Below the dotted line 703, there is limited network connection between the client device 602 and the beam API server 603 without the beam modem 601 (for example after the user arrives in an area with limited network connectivity).

After the client device 602 transfers client information 701 directly to the beam API server 603, the beam API server 603 then stores 702 the client information. Then, once the user has arrived in an area with limited network connectivity, the method proceeds as shown in FIG. 6a from the step of the client device 602 generating a web request 610 to the step of the beam API sever 603 transmitting the request data 645 to the external web service 607. At this point, the external web service 607 may send back one or more queries 750 to the beam API server 603. The beam API server 603 uses the client information 701 previously stored 702 to respond 755 to the queries 750. For example, client information 701 may include personal information including preferences, log in information for external web services (e.g., ID and password), and travel destinations. The client information 701 may also include additional web service 607 specific information such as which fields that the web service uses which are important to the client.

In one example of this method, if the client device 602 sends a request for a favorite location stored at an external web service 607, the external web service 607 to which the request is routed may respond by requesting a user name and password to access the account under which the favorite is stored. The external web service 607 sends one or more queries 750 back to the beam API server 603, and the beam API server 603 sends one or more query responses 755 back to the external web service 607 with the user name and password.

The query 750 and query response 755 steps may be repeated until the external web service 607 has received the information it needs to respond to the request data 645. At this point, the external web service 607 transmits the response data 650 as shown in FIGS. 6a and 6b, the beam API server 603 receives response data 650 from the external web service 607, and the method then continues as shown in FIG. 6b.

Figure 8:
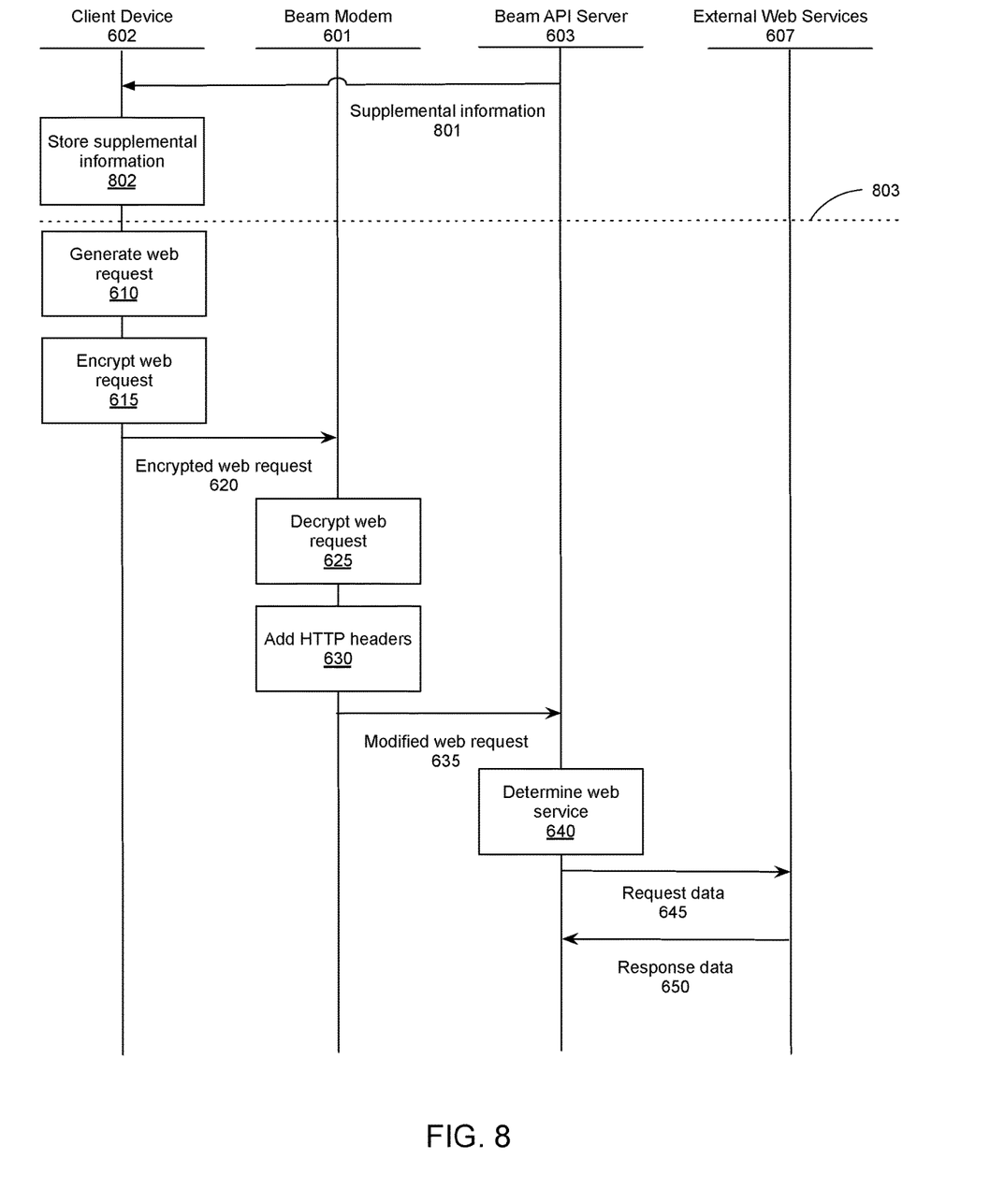
FIG. 8 illustrates additional exemplary methods of addressing, routing, and data traffic control between a client device, a beam modem, a beam API server, and an external web service.

FIG. 8 illustrates another exemplary method of addressing, routing, and data traffic control with the client device 602, beam modem 601 and beam API server 603 that may be used in addition to and/or in conjunction with the methods illustrated in FIGS. 6a and 6b. When the client device 602 has a network (e.g., Internet) connection, the beam API server 603 may transfer supplemental information 801 directly to the client device 602 (without using the beam API modem 601) that may be used to supplement or help respond to the request data 645. Dotted line 803 indicates the presence of a network connection between the client device 602 and the beam API server 603 without the beam modem 601. Above the dotted line 803, there is a network connection between the client device 602 and the beam API server 603 without the beam modem 601 (for example before the user arrives in an area with limited network connectivity). Below the dotted line 803, there is limited network connection between the client device 602 and the beam API server 603 without the beam modem 601 (for example after the user arrives in an area with limited network connectivity).

After the beam API server 603 transfers the supplemental information 801 directly to the client device 602, the client device 602 then stores, or pre-caches, the supplemental information 802. Then, once the user has arrived in an area with limited network connectivity, the method proceeds as shown in FIG. 6a from the step of the client device 602 generating a web request 610. Because the client device 602 has stored the supplemental information 802, the client device 602 may generate a web request 610 that does not include a request that would require the supplemental information 802 (or a portion of the supplemental information) in response. Alternatively, or in addition, the beam API server 603 may parse the web request 635 to determine what portion of the request information is already stored on the client device 602. The beam API server 603 then may ask the external web service 607 (in a request for data 645) only for the portion of the requested information that is not already stored on the client device 602. Also, the beam API server 603 may parse the response data 650 from the external web service 607 to determine the portion of the response data 650 not already stored on the client device 602. The method then proceeds as shown in FIG. 6b. Once the client device 602 receives the decompressed response data 685, it combines it with the stored supplemental information 802.

In one example of this method, the stored supplemental information on the client device 602 is map data. Before a trip, when the user has a good connection to the Internet, the beam API server 603 receives information about where the user will be traveling and communicates with the client device 602 to store map data for the travel location on the client device 602. Then, when the user is traveling in the specified location and sends a web request for location data, the beam API server 603 only has to transmit data that has not already be pre-cached such as the location of a restaurant or point of interest, but does not have to transmit map data to enable navigation on the client device 602.

ADDITIONAL CONSIDERATIONS

The foregoing description of the embodiments has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

We claim:

1. A system comprising:
a beam modem comprising:
a short range transceiver;
a cellular transceiver; and
a processor configured to:
receive, using the short range transceiver, a web request from a client device;
modify the web request;
transmit, using the cellular transceiver, the modified web request;
receive, using the cellular transceiver, response data in response to the modified web request, wherein the response data includes a plurality of updates sent at an update rate, and wherein the cellular transceiver receives the response data at a rate lower than the update rate; and
transmit, using the short range transceiver, the received response data to the client device.

2. The system of claim 1, wherein the response data includes a plurality of results responsive to the web request, and wherein the processor is configured to remove unnecessary data from the response data by removing a portion of the plurality of results.

3. The system of claim 2, wherein the response data includes a plurality of fields, and wherein the processor is further configured to:
determine respective data sizes for each of the plurality of fields;
identify the unnecessary data based at least in part on the respective data sizes; and
remove the unnecessary data from the response data by removing a field of the plurality of fields comprising the unnecessary data.

4. The system of claim 3, wherein the plurality of fields comprises a header that comprises the unnecessary data, and wherein the processor is configured to remove the unnecessary data from the response data by removing the header.

5. The system of claim 1, wherein the processor is further configured to reduce a size of the response data by removing white space characters, new line characters, comments or block delimiters.

6. The system of claim 1, wherein the processor is further configured to reduce a size of the response data using a key map of the response data and to decompress the reduced response data using the key map.

7. The system of claim 1, wherein the processor is further configured to reduce a size of the response data by zipping the response data and to decompress the reduced response data by unzipping the response data.

8. The system of claim 1, wherein the processor is further configured to receive client information from the client device when the client device has an Internet connection and to use the client information to respond to a request for information from an external web service in response to the web request.

9. The system of claim 1, wherein the processor is further configured to transfer data supplemental to the web request to the client device when the client device has an Internet connection to augment the response data from the short range transceiver.

10. The system of claim 9, wherein the data supplemental to the web request comprises map data and the response data comprises location data.

11. The system of claim 1, wherein modifying of the web request comprises adding a transfer protocol header to the web request.

12. A computer implemented method comprising:
receiving, using a short range transceiver of a beam modem, a web request from a client device;
modifying the web request;
transmitting, using a cellular transceiver of a beam modem, the modified web request;
receiving, using the cellular transceiver, response data in response to the modified web request, wherein the response data includes a plurality of updates sent at an update rate and wherein the cellular transceiver receives the response data at a rate lower than the update rate; and
transmitting, using the short range transceiver, the received response data to the client device.

13. The method of claim 12, wherein the response data includes a plurality of results responsive to the web request, and wherein the method further comprises removing unnecessary data from the response data by removing a portion of the plurality of results.

14. The method of claim 13, wherein the response data includes a plurality of fields, and wherein the method further comprises:
determining respective data sizes for each of the plurality of fields;
identifying the unnecessary data in the response data based at least in part on the respective data sizes; and
removing the unnecessary data from the response data by removing a field of the plurality of fields comprising the unnecessary data.

15. The method of claim 14, wherein the plurality of fields comprises a header that comprises the unnecessary data, and wherein the method further comprises removing the unnecessary data from the response data by removing the header.

16. The method of claim 12, wherein the method further comprises reducing a size of the response data by removing white space characters, new line characters, comments or block delimiters.

17. The method of claim 12, wherein the method further comprises reducing a size of the response data using a key map of the response data and decompressing the reduced response data using the key map.

18. The method of claim 12, wherein the method further comprises reducing a size of the response data by zipping the response data and decompressing the reduced response data by unzipping the response data.

* * * * *